No. 644,154. Patented Feb. 27, 1900.
M. STARK.
TIRE REMOVER.
(Application filed July 29, 1899.)
(No Model.)

Witnesses
E. W. a. Peter
W. A. Peter

Inventor
Myron Stark
By his Attorney
Geo. B. Willcox

THE NORRIS PETERS CO., PHOTO-LITHO., WASHINGTON, D. C.

UNITED STATES PATENT OFFICE.

MYRON STARK, OF DOWAGIAC, MICHIGAN.

TIRE-REMOVER.

SPECIFICATION forming part of Letters Patent No. 644,154, dated February 27, 1900.

Application filed July 29, 1899. Serial No. 725,495. (No model.)

*To all whom it may concern:*

Be it known that I, MYRON STARK, a citizen of the United States, residing at Dowagiac, in the county of Cass and State of Michigan, have invented certain new and useful Improvements in Tire-Removers; and I do hereby declare the following to be a full, clear, and exact description of the invention, such as will enable others skilled in the art to which it appertains to make and use the same.

My invention relates to machines for removing tires from vehicle-wheels; and the improvements consist in the means and devices by which I accomplish the objects of my invention, which are, first, to provide a tire-remover that is simple and inexpensive and that will occupy but small space; second, to so arrange the operating parts that by simply shifting the lever mechanism the machine may be adapted for removing very wide tires by operating one or more times around the rim of the wheel, the lever always moving through a constant angle—say from the hip to the knee of the operator; third, to provide means for accurately and quickly adjusting the wheel to position and to adapt the device to wheels of different diameters, and, fourth, to so construct the device as to render all its parts readily accessible for inspection or repair.

My invention is illustrated in the accompanying drawings, throughout the several views of which similar figures of reference designate corresponding parts and devices.

Figure 1:
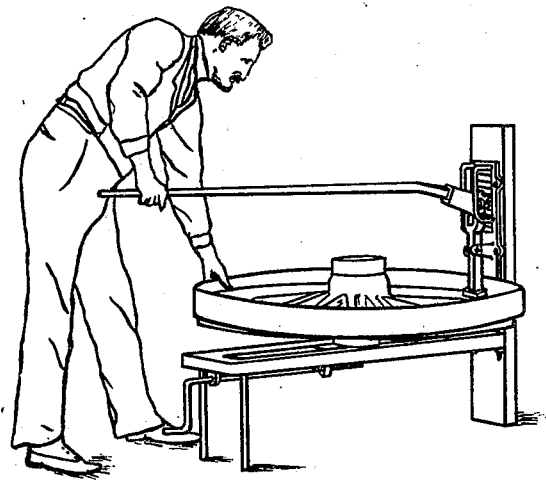
Figure 2:
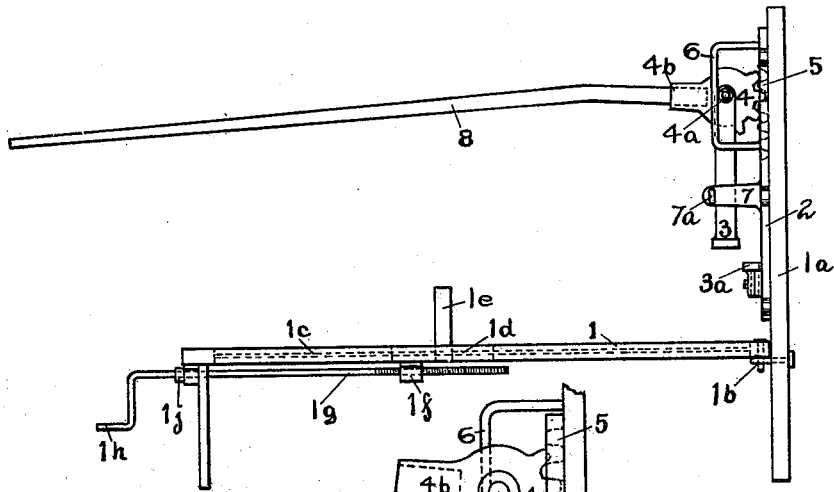
Figure 3:
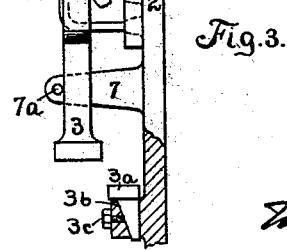

In the drawings, Figure 1 is a view of the device in use. Fig. 2 is a side view of the device, and Fig. 3 is a detail of the moving parts.

As is plainly shown in the drawings, the tire-remover consists in a horizontal frame 1 for supporting the wheel and an upright back $1^a$ for carrying the tire-removing mechanism. In practice I prefer to make the two parts 1 and $1^a$ detachable, connecting them when in use by a pin and an eyebolt connection $1^b$ or other suitable means. The device may thus be knocked down and stored in small space when not in use.

The horizontal frame 1 is provided with longitudinal grooves $1^c$, in which slides a hub-supporting plate $1^d$, carrying a hub-centering pin $1^e$. Longitudinal adjustment of the plate is secured by means of a threaded nut $1^f$, attached to the plate, a screw-shaft $1^g$ engaging therein and operated by a suitable crank $1^h$. Longitudinal movement of the shaft $1^g$ is prevented by a collar $1^j$, which bears against the outer bearing of the shaft.

The tire-removing mechanism consists in a standard 2, carrying a vertically-movable plunger 3 and a tire-supporting shoe $3^a$. A pinion 4, operated by a removable lever, is centered by a removable pin $4^a$ to the upper end of the plunger 3, its teeth meshing with the teeth of a rack 5, carried by the standard. Vertical guides 6 hold the pinion against the rack, and a bracket 7, having a removable pin $7^a$, guides the plunger and permits its easy removal. The operating-lever 8 is removably engaged in a socket $4^b$, formed integral with the pinion 4.

The operation of my improved tire-remover is as follows: A wheel placed on the centering-pin $1^e$ is adjusted by means of the screw $1^g$, so as to bring the edge of the tire to a firm bearing on the top of the tire-supporting shoe $3^a$. The lever 8, which is preferably bent as shown in the drawings, is inserted in the socket $4^b$ in the position shown in Fig. 1. Pressing the lever down forces the foot of the plunger 3 against the rim of the wheel and pushes the rim down from the tire, as shown. After turning the wheel somewhat the movement is repeated until the wheel has made a revolution and each part of the rim has been successively pressed down by the plunger 3.

With narrow-tire wheels one turn may be sufficient; but with the very broad tires now in common use it is sometimes necessary to go several times around the wheel in order to entirely separate the tire from the rim. In order to avoid the excessive swing of the lever necessary to force off a wide tire at one operation and to provide means for removing such tires by successive step-by-step movements, so as not to bind the tire to the rim, I have arranged the parts of my invention to permit its operation with the lever always in the position of greatest mechanical advantage, where the entire weight of the operator can be exerted upon it. I accomplish this by operating once around the wheel-rim, thus forcing the rim partly off, then inverting the lever and going around the rim as before. The pin 4ª is then drawn out and the pinion 4 is reëngaged in the lower teeth of the rack 5. The pin is then replaced and the lever is restored to its first position. By operating around the rim as before if the tire is of any ordinary width it may now be forced entirely off the rim; but it is evident that however wide the tire may be it can be easily and quickly removed by repeating the above operation.

In practice I prefer to make the tire-supporting shoe 3ª detachable from the standard 2 for convenience in repairing or renewing the shoe, securing it in place by a dovetail guide 3ᵇ and bolt 3ᶜ. The rack 5 may also be made in a separate piece detachable from the standard 2, if desired, without departing from the spirit of my invention.

By the means above described I produce a tire-remover that is simple and inexpensive, that can be used on a wheel of any size, and that will remove a tire of any width. The position of the operating-lever is always convenient to the operator and the stroke of the lever is comparatively small. The tire is removed step by step, thus preventing binding the rim or injuring the wheel, the latter being at all times free from transverse strain.

It will be noticed that all the parts are easily removed for repairs or renewal, and the construction of the machine is such as to give great strength, together with simplicity and compactness.

Having described my invention, what I claim is—

In a tire-remover comprising a wheel-centering frame, a tire-supporting shoe and a fixed rack, the operating means herein described, comprising in combination: a plunger slotted at its upper end, a segmental pinion removably pivoted in said slotted end, a socket formed in said pinion, a bent lever removably inserted in said socket, and guides for retaining said pinion in mesh with the rack; all arranged substantially as described, and operating for the purposes set forth.

In testimony whereof I affix my signature in presence of two witnesses.

MYRON STARK.

Witnesses:
ABNER M. MOON,
JOHN WORSTER.